(12) United States Patent
Curcio et al.

(10) Patent No.: US 8,911,683 B2
(45) Date of Patent: Dec. 16, 2014

(54) MICRO CHAMBER

(75) Inventors: Mario Curcio, Sins (CH); Carlo Effenhauser, Weinheim (DE); Michael Glauser, Rotkreuz (CH)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 649 days.

(21) Appl. No.: 12/142,019

(22) Filed: Jun. 19, 2008

(65) Prior Publication Data

US 2009/0016932 A1     Jan. 15, 2009

(30) Foreign Application Priority Data

Jul. 10, 2007    (EP) .................................... 07013434

(51) Int. Cl.
*B01J 19/00* (2006.01)
*B01L 3/00* (2006.01)
*B01F 13/00* (2006.01)

(52) U.S. Cl.
CPC ..... *B01F 13/0084* (2013.01); *B01L 2400/0694* (2013.01); *B01L 3/5027* (2013.01); *B01J 2219/00837* (2013.01); *B01J 2219/00889* (2013.01); *B01F 13/0064* (2013.01); *B01J 2219/00783* (2013.01); *B01J 2219/00833* (2013.01); *B01J 19/0093* (2013.01); *B01F 13/0071* (2013.01); *B01J 2219/0086* (2013.01); *B01L 2400/088* (2013.01); *B01L 2300/0867* (2013.01); *B01L 2300/165* (2013.01)
USPC ............. 422/502; 422/503; 422/50; 422/504; 366/173.1

(58) Field of Classification Search
USPC .......... 422/68.1, 502, 503, 504, 507, 505, 50, 422/56, 57; 366/173.1, 143; 436/43, 52, 53
See application file for complete search history.

(56) References Cited

U.S. PATENT DOCUMENTS

| | | | |
|---|---|---|---|
| 5,904,824 A | 5/1999 | Oh | |
| 6,821,485 B2 * | 11/2004 | Beebe et al. | ................. 422/68.1 |
| 2007/0047388 A1 | 3/2007 | DeNatale et al. | |
| 2009/0017505 A1 * | 1/2009 | Sieben et al. | ................. 435/91.2 |

FOREIGN PATENT DOCUMENTS

| | | |
|---|---|---|
| EP | 0977032 B1 | 2/2000 |
| EP | 1643231 A1 | 4/2006 |
| WO | 01/52975 A1 | 7/2001 |
| WO | WO2007024410 | * 3/2007 |

OTHER PUBLICATIONS

Nguyen et al. "Micromixers—a review", J. Micromech, Microeng. 2005, 15, R1-R16.

(Continued)

*Primary Examiner* — In Suk Bullock
*Assistant Examiner* — Sharon Pregler
(74) *Attorney, Agent, or Firm* — Roche Diagnostics Operations, Inc.

(57) ABSTRACT

A microfluidic device is provided including at least one chamber accessible by microfluidic channels characterized in that the surface of the channels and the chambers are patterned and comprise hydrophilic and hydrophobic areas. The surface energy in correspondence of the areas, i.e., the capillary force, being such that a liquid can be guided along the hydrophilic path, enter the chamber from one side, wet part of one surface of the chamber as a thin layer without touching the opposite surface of the chamber, thus avoiding to fill the volume inside the chamber in correspondence of the hydrophilic pattern until a second liquid, either sequentially or in parallel, comes to wet part of the opposite surface of the chamber and eventually touches the first liquid layer, resulting in a sudden coalescence and efficient mixing between the liquids.

26 Claims, 6 Drawing Sheets

(56) References Cited

OTHER PUBLICATIONS

Zhao et al. "Surface-Directed Liquid Flow Inside Microchannels", Science 2001, 291, 1023-1026.
Zhao et al. "Principles of Surface-Directed Liquid Flow in Microfluidic Channels", Anal. Chem. 2002, 74, 4259-4268.
Lam et al. "Surface-Tension Confined Microfluidics", Langmuir 2002, 18, 948-951.
Bouaidat et al. "Surface-directed capillary system; theory, experiments and applications", Lab Chip 2005, 5, 827-836.
Chen et al. "A microfluidic nanoliter mixer with optimized grooved structures driven by capillary pumping", J. Micromech, Microeng. 2006, 16, 1358-1365.
European Search Report dated Dec. 6, 2007 in EP07013434.

* cited by examiner

MICRO CHAMBER

FIELD OF THE INVENTION

The present invention refers to a microfluidic device comprising chambers and a method of using such device for mixing liquids.

BACKGROUND OF THE INVENTION

Since initiation and activation of a chemical or biochemical process requires mixing between reagents, microfluidic systems have much to offer, but a useful microfabricated system should be able to provide not only effective and convenient means to drive and guide liquids in microchannels but also efficient and rapid means to mix them.

Different methods have been proposed to enhance mixing in microfluidic systems, both active and passive. Passive methods are the most attractive since they do not require external energy, while mixing, due to the dominating laminar flow, relies entirely on diffusion or chaotic advection. These methods work by increasing the contact surface and/or decreasing the diffusion path to improve mixing, but the design and manufacture is not always simple and the use of a pump to drive liquids through the channels is in most cases still a need.

Selective wetting is achieved by hydrophilic or hydrophobic patterning of hydrophobic or hydrophilic surfaces, respectively. If two surfaces with mirror image patterns are aligned, separated by a small gap, specific flow paths can be obtained. An aqueous liquid can move driven by capillary forces remaining confined by surface tension between the hydrophilic areas without physical sidewalls. In this way bubble-free, dead-ended flow patterns, as well as chamber filling, can be achieved. This might occur however also when only one of the two surfaces is hydrophilically patterned and the other is entirely hydrophobic, with the advantage to avoid precise alignment. It is important in both cases to choose the dimensions, such as width of the pattern and distance between surfaces, in the allowed range according to the described theories and the experimental data, and the requirement for a pump is thus eliminated.

The combination of passive mixers with capillary pumping is thus preferable but limitations still exist. This might be useful, e.g., to dissolve dry chemistry along the path, but these paths are usually long and the linear velocities small. By taking one step back and using external pumps the process can be speeded up, but controlling the flow path, e.g., introducing a defined volume or stopping the liquid at a defined location and time, can be difficult.

Often, for many useful, real life applications, e.g., in vitro diagnostics assays, reaction kinetics studies, drug- and bio-interaction screening and sample preparation, what is needed is that very small and discrete volumes of reagents are delivered and rapidly mixed into a small reaction chamber or array of chambers, e.g., sub-microliter chambers, which are also preferably detection chambers, thus without further movement of the liquids and without much excess of reagents occupying dead volume or being flushed through the system. Sometimes, especially for reaction kinetics studies, what is required is also a pulsed, well defined start time. Finally, if desired, e.g., as part of sample preparation, the transfer of the small reacted discrete volumes downstream for further processing, should also be easily made possible.

It was already mentioned that surface-directed capillary systems without sidewalls can be used also to fill micro-chambers but the efficient controlled mixing of different small discrete amounts of liquids inside such micro-chambers has not been yet described. In WO 01/52975 A1 a capillary force mixer is disclosed where exactly the opposite concept of efficient mixing is applied, that is the contact surface between two liquids is decreased and the diffusion path is increased.

SUMMARY OF THE INVENTION

It is against the above background that the present invention provides certain unobvious advantages and advancements over the prior art. In particular, the inventors have recognized a need for improvements in microfluidic devices and methods of using same.

Although the present invention is not limited to specific advantages or functionality, it is noted that the present invention provides a simple, low-cost disposable device for controlled capillary liquid transport and efficient passive mixing of sub-microliter volumes of liquid reagents, ideal for parallel array formats of micro-chambers in the microliter and sub-microliter range. This device turns particularly useful for in vitro diagnostics (IVD) applications, reaction kinetics studies, drug- and bio-interaction screening and sample preparation before further processing.

In accordance with one embodiment of the present invention, a microfluidic device is provided comprising a substrate, a cover, at least one chamber formed between the substrate and the cover, and lateral hydrophilic and hydrophobic areas configured for guiding liquids to the at least one chamber. The chamber comprises two opposite surfaces, one on the substrate and one on the cover respectively, each surface comprising hydrophilic and hydrophobic areas. The device is configured such that at least two liquids enter the at least one chamber as thin layers, each wetting one respective surface of the chamber, and as the layers on each respective surface grow, they touch each other and coalesce.

In accordance with another embodiment of the present invention, a method of mixing at least two liquids is provided comprising providing the device according to claim 1, guiding the at least two liquids into the chamber in a continuous way, that is each continuing to advance along its same plane, or that the at least two liquids enter the chamber in a discontinuous way, that is following the step due to the different depth of the chamber, and coalescing and/or mixing the at least two liquids within the chamber.

These and other features and advantages of the present invention will be more fully understood from the following detailed description of the invention taken together with the accompanying claims. It is noted that the scope of the claims is defined by the recitations therein and not by the specific discussion of features and advantages set forth in the present description.

BRIEF DESCRIPTION OF THE DRAWINGS

The following detailed description of the embodiments of the present invention can be best understood when read in conjunction with the following drawings, where like structure is indicated with like reference numerals and in which:

FIG. 7A represents an array of individually addressable chambers. FIG. 7B represents an array of chambers, which are communicating from one side, i.e., addressable in parallel and in one step by one liquid, while they are still individually addressable from the other side by a second liquid.

Figure 1:
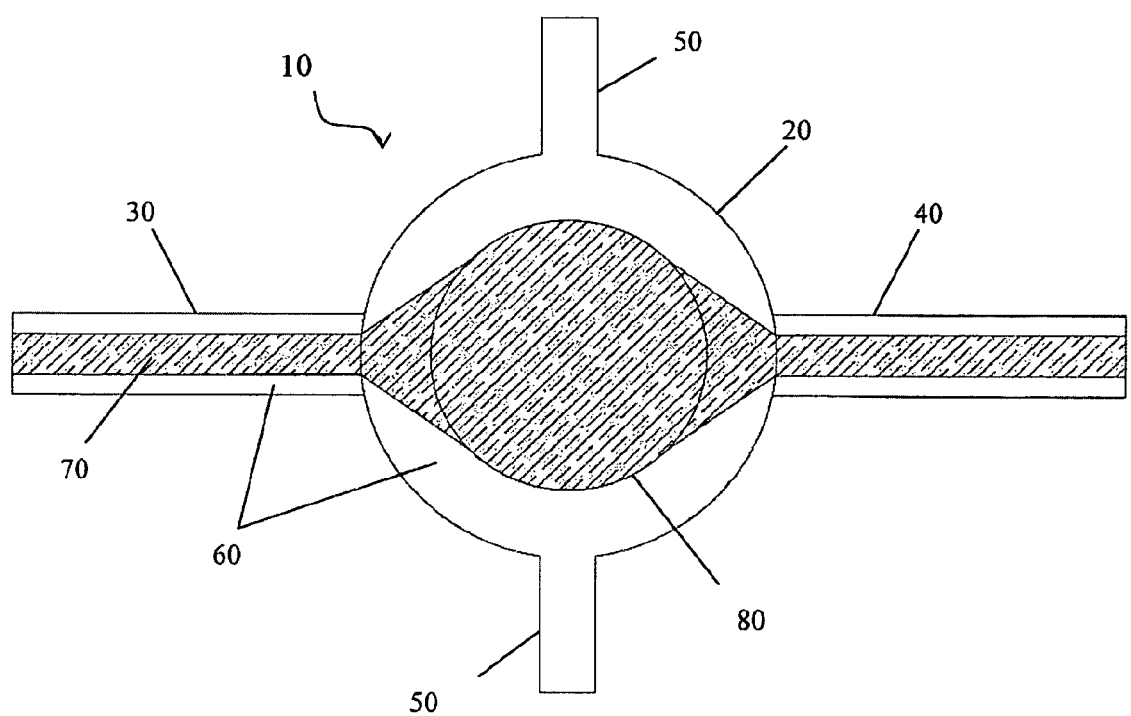
FIG. 1 represents schematically and not to scale a transparent top view of a generic device comprising a generic chamber, generic channels driving liquids into this chamber, and generic side channels, where hydrophilic and hydrophobic areas are distinguished and symmetrically overlapped as being part of at least two different assembled layers on top of each other.

Skilled artisans appreciate that elements in the figures are illustrated for simplicity and clarity and have not necessarily been drawn to scale. For example, the dimensions of some of the elements in the figures may be exaggerated relative to other elements to help improve understanding of the embodiment(s) of the present invention.

DETAILED DESCRIPTION OF THE INVENTION

In accordance with one embodiment of the present invention, a microfluidic device is provided comprising a substrate, a cover, at least one chamber formed between the substrate and the cover, the chamber comprising two opposite surfaces, one on the substrate and one on the cover respectively, each surface comprising hydrophilic and hydrophobic areas, wherein each hydrophilic area on each of the two opposite surfaces of the chamber can be wetted independently by at least one liquid.

The device according to another embodiment of the present invention may further comprise lateral hydrophilic and hydrophobic areas or patterns, the lateral hydrophilic and hydrophobic areas leading to the at least one chamber. In yet another embodiment, the lateral hydrophilic and/or hydrophobic areas or patterns are comprised in microchannels, which could be formed either in the substrate or in the cover. Another possibility is that the microchannels are formed both in the substrate and in the cover. Still another possibility is that the microchannels are formed by at least one spacer layer between the substrate and the cover.

The lateral hydrophilic areas or patterns may be only on one side, that is either on the substrate or on the cover, but may also be on both the substrate and the cover.

Typically, the hydrophilic areas are confined within or surrounded by hydrophobic areas.

The surface energy in correspondence of the areas, i.e., the capillary force, is such that a liquid can be guided along a lateral hydrophilic area or pattern by capillary force, enter the chamber from one side, wet part of one surface of the chamber as a thin layer without touching the opposite surface of the chamber, thus avoiding to fill the volume inside the chamber in correspondence of the hydrophilic pattern until a second liquid, either in parallel or sequentially, comes to wet part of the opposite surface of the chamber with a similar mechanism or path and eventually touches the first liquid layer, resulting in a sudden coalescence and efficient mixing between the liquids.

The mixing is efficient because the contact surface is large and because of the chaotic advection generated at the moment the two liquids touch and coalesce. Indeed, the chamber is typically a micro-chamber wherein the volume of the micro-chamber is typically between 0.01 μL and 5 μL, more typically between 0.05 μL and 2 μL, and the height of the micro-chamber, i.e., the distance between the wetted surfaces is typically below about 1 mm, more typically below about 300 μm, so that the average diffusion distance remains relatively small. Since achieving accurate volumes in such small ranges may be difficult, it is understood however that these ranges are approximate and are not limiting.

It is important to note that the liquid follows only the hydrophilic pattern also inside the chamber, that is a hydrophobic surrounding adjacent to the hydrophilic areas assures that the liquid remains confined within the pattern without ever touching laterally physical side walls. The volume of the liquids being mixed is thus not defined by the volume of the chamber as such but by the volume defined by the hydrophilic areas within it. In other words, the volume of the chamber is defined by the volume between the hydrophilic areas on the two opposite surfaces of the chamber.

The non wetted hydrophobic areas or surrounding inside the chamber communicates with the outside of the device, e.g., by means of other side channels, so that the system is vented from all sides, allowing air to escape with proper flow and filling, without trapping air bubbles.

The liquids to which reference is made in the present invention are typically chemical or biochemical solutions, or reagents, in polar solvents, typically aqueous solutions or reagents. It is of course possible to invert the position of hydrophilic and hydrophobic areas and work with non polar liquids or organic solvents instead.

In accordance with the present invention, the contact angle of the hydrophilic areas can be below about 30 degrees, typically below about 20 degrees, and if the contact angle of the hydrophobic areas is above about 100 degrees, more typically above about 110 degrees. There are different methods and technologies available to achieve stable patterns using either wet or gas phase processes. A typical and convenient option is plasma polymerization. The substrate for patterning, that is the material used for the device can be any suitable polymeric material, typically but not necessarily transparent, that can be easily and cheaply manufactured by, e.g., molding, and the device can be disposable. In order to achieve high values of the contact angle for the hydrophobic areas, a hydrophobic plasma polymerization step could be executed first homogeneously on the surface to be hydrophilically patterned in order to yield a surface that is more hydrophobic than the polymeric material used naturally might be, followed by masking and hydrophilic patterning on top of the hydrophobic surface.

Other conditions making possible the capillary flow and the wetting of, e.g., only one of two parallel surfaces without touching the other can vary and basic theories can be found in the literature. It is for example known that the width of the path is typically larger than the height of the channel, which has to be sufficiently small in order to maximize the capillary force, hence the linear velocity, but not too small because of the flow resistance. It depends much also on whether only one or both surfaces of the microchannels are hydrophilically patterned. In order to give just an indication, it would be good to keep the height below 50 µm and the width above 200 µm, while the chamber is typically more than three times higher than the channel.

A generic device 10 according to the present invention comprising a generic chamber 20, generic microfluidic channels 30 and 40 driving respectively first and second liquid to be mixed into the chamber 20, and generic side channels 50 is disclosed in FIG. 1. Here hydrophilic areas (hatched) 70 and hydrophobic areas (white) 60 are distinguished from one another. The device 10 in FIG. 1 has to be seen as a transparent top view, not to scale, consisting of at least two symmetrically overlapped different layers, also defined as substrate 11 and cover 12, assembled on top of each other.

Figure 2:
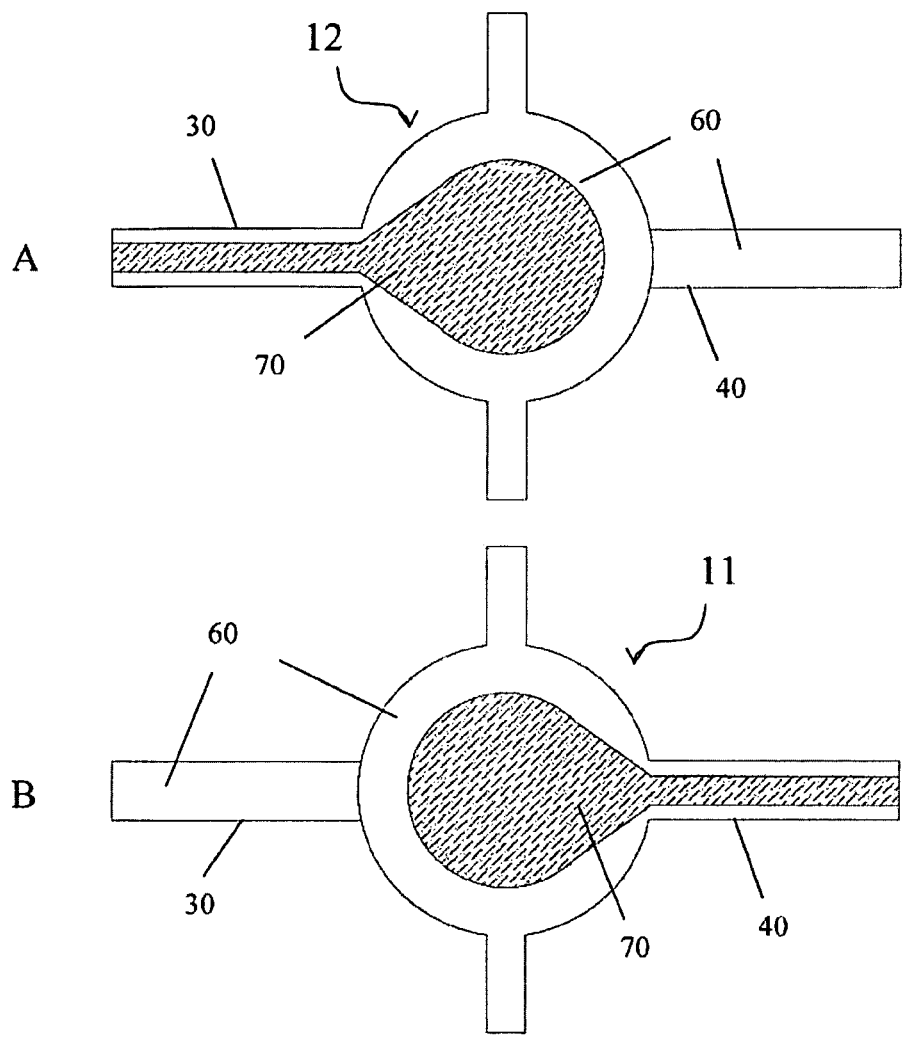
FIGS. 2A and 2B represent respectively the inside view of the two halves, which upon superimposition form one of the embodiments according to FIG. 1. Specifically, they represent the embodiments in which the liquids are driven along the channels by the hydrophilic area or pattern present only on one surface of the channels.
Figure 3:
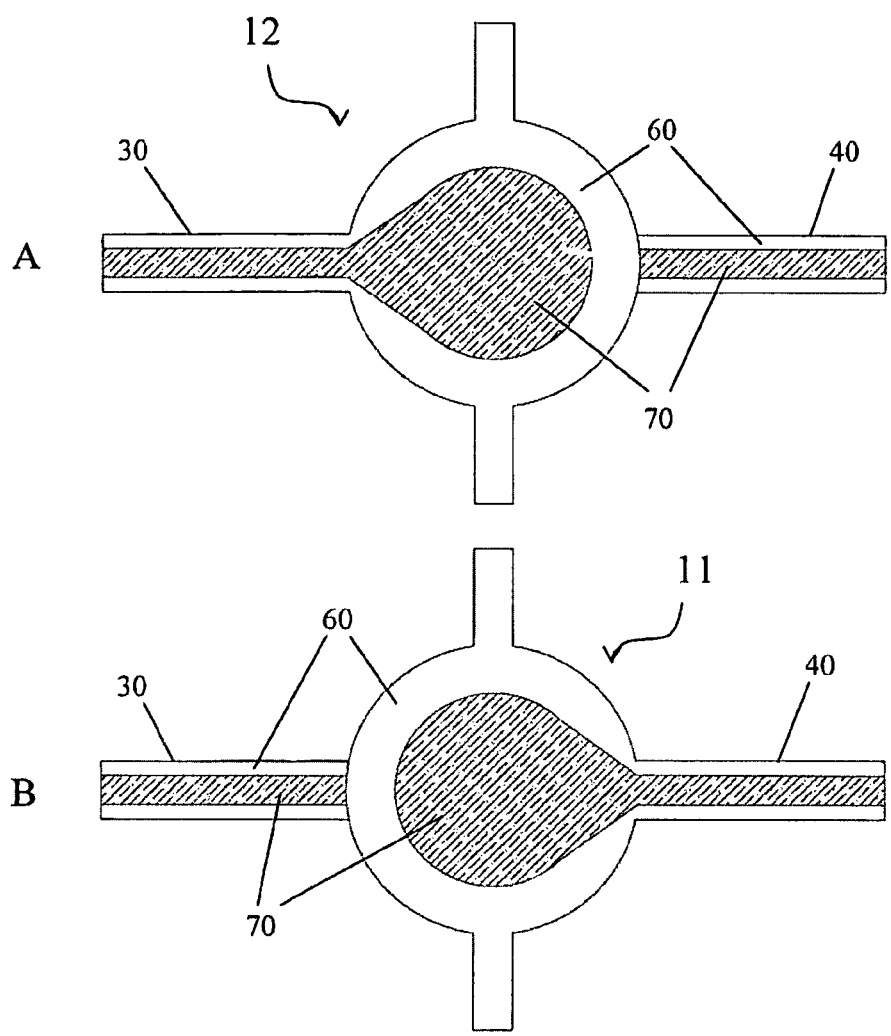
FIGS. 3A and 3B represent respectively the inside view of the two halves, which upon superimposition form one of the embodiments according to FIG. 1. Specifically, they represent the embodiments in which the liquids are driven along the channels by the hydrophilic area or pattern present on both top and bottom surface of the channels.

The internal sides of substrate 11 and cover 12 are independently shown in FIGS. 2 and 3, which represent two of the possible embodiments of device 10. Specifically, FIG. 2 represents the embodiment in which the liquids are driven along the channels 30 and 40 by the hydrophilic area or pattern 70 present only on one surface of the channels and FIG. 3 represents the embodiment in which the liquids are driven along the channels 30 and 40 by the hydrophilic areas or patterns 70 present on both surfaces of the channels.

It should be noted that according to the present invention it is not important how large the hydrophobic area 60 on either side of the hydrophilic pattern 70 both in the channels 30 and 40 and in the chamber 20 is. The device 10, for example, might contain an array of chambers 20 defined just by a hydrophilic pattern 70 on large hydrophobic surfaces 60 parallel and at short distance between them with no channels 30, 40 and 50 at all, or with channels 30, 40 and 50 differently arranged according to use. Needless to say is that different chambers in an array might also have different designs and represent different volumes.

For ease of understanding one can imagine that the first liquid comes from channel 30, the second liquid comes from channel 40, they both enter the chamber 20 simultaneously or within short time one after another, each wetting only one respective surface and as the liquid layers on each respective surface eventually grow, they touch each other and coalesce in the region 80 of device 10, that is the volume defined by the two hydrophilic areas 70 on the top and the bottom surfaces of the chamber 20. The reaction volume, that is the volume of the liquids being mixed, is thus not defined by the volume of the chamber 20 as such but by the volume 80 defined by the hydrophilic areas within the chamber 20.

Although more difficult to control, one can of course imagine to bring with the same mechanism more than two liquids into the chamber 20 and mix two or more of them with different ratios. This could be achieved for example by designing the top and bottom areas 70 inside the chamber 20 differently and/or by subdividing the hydrophilic areas 70 in correspondence of the mixing or reaction zone 80 by means of thin hydrophobic patterns 60 or grooves, in correspondence of which each liquid layer would stop advancing.

The pressure inside the device is the same as outside the device, that is the system operates under atmospheric pressure. Indeed the non wetted zone in correspondence of the hydrophobic area 60 inside the chamber 20 and the side channels 50 allow air to escape. In other words, the system is vented from all sides, allowing proper flow and filling without trapping air bubbles.

The side channels 50 might also be used to introduce in a second stage an immiscible organic liquid with the function to transport the aqueous reacted sample out of the chamber 20 as a discrete droplet or plug. This is particularly advantageous if the device 10, especially in an array format, is used for sample preparation starting from very small amounts of reagents.

Figure 7:
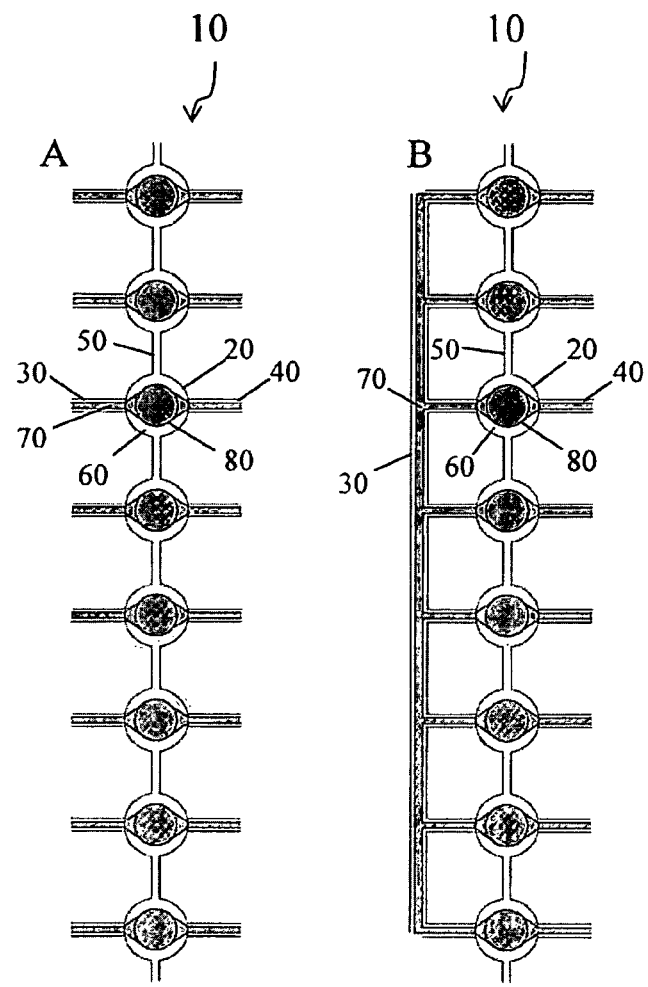
FIG. 7 represents two of the possible embodiments of arrays consisting of a plurality of chambers, such as those in FIG. 1.

According to the present invention, the device 10 is however particularly suitable for a static reaction mode, where small amounts of reagents are brought into contact with each other in parallel and/or in various combinations, like for example shown in the embodiments of FIG. 7, and detection is carried out in situ through the transparent body of each chamber 20.

The device 10 can be for example advantageously used especially for in vitro diagnostics (IVD) applications, drug- and bio-interaction screening and reaction kinetics studies. The latter requires indeed a well defined start time, which can be identified with the time in which the two liquids coalesce.

Figure 4:
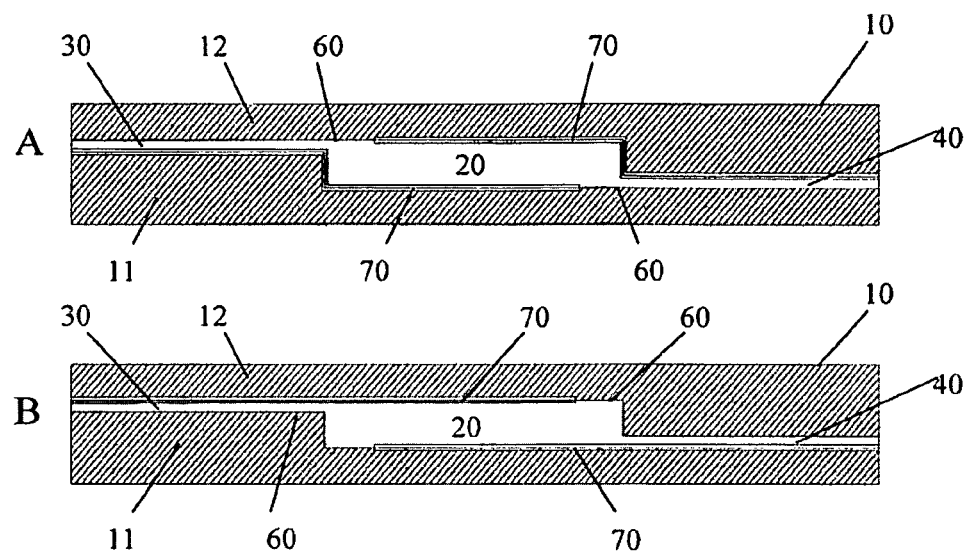
FIGS. 4A and 4B represent respectively section views of two of the possible embodiments according to FIGS. 1 and 2.

With reference to FIG. 2, this is a particular embodiment of device 10 with only one surface of channels 30 and 40, that is with either the substrate 11 or the cover 12, being respectively patterned with hydrophilic area or pattern 70. This can be further characterized in other embodiments as shown in side view in FIG. 4 according to the way the hydrophilic areas 70 continue their paths and thus guide the liquid layers from the channels 30 and 40 into the chamber 20. In FIG. 4B, for example, the path from each channel is continuous, continuing to advance along the same plane. In FIG. 4A instead, the path is discontinuous, in the sense that it follows the step due to the different depth of the chamber 20.

Analogous considerations can be made with reference to FIGS. 5A and 5B, which in turn refer to the embodiment of FIG. 3 with both top and bottom surfaces of the channels 30 and 40, that is with both the substrate 11 and the cover 12, being patterned.

Figure 6:
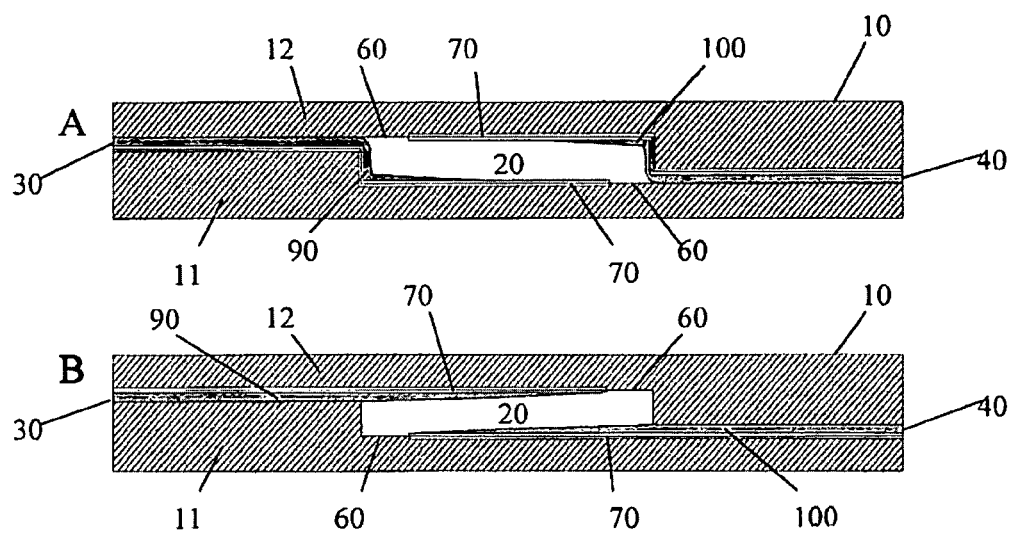
FIGS. 6A and 6B represent respectively and always schematically the liquid paths along the hydrophilic patterns from the channels into the chamber for the embodiments of FIG. 4. Similar paths can be assumed for the embodiments of FIG. 5.

FIGS. 6A and 6B provide a schematic representation of the paths followed by the liquids 90 and 100 along said hydrophilic paths from the channels 30 and 40 respectively into the chamber 20 for the embodiments of FIGS. 4A and 4B respectively.

Figure 5:
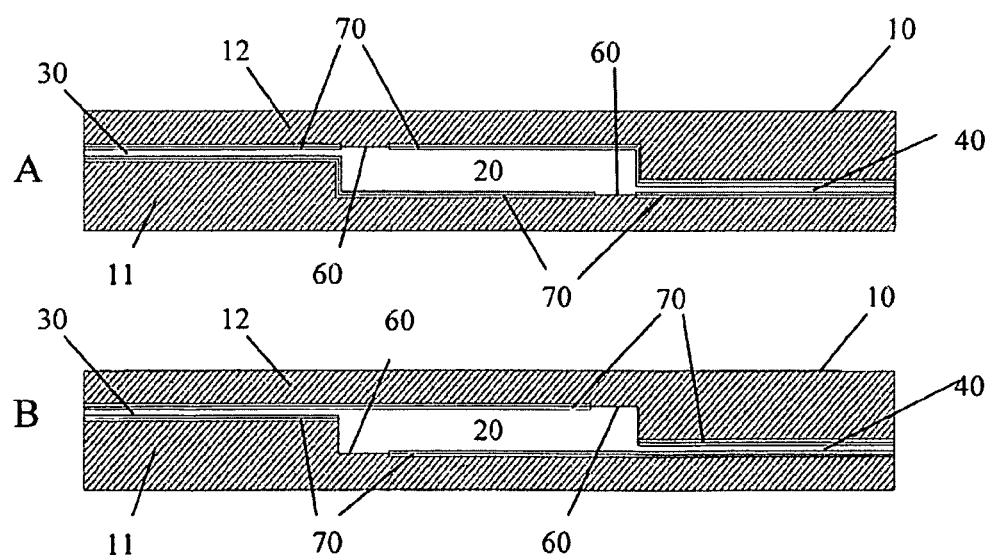
FIGS. 5A and 5B represent respectively section views of two of the possible embodiments according to FIGS. 1 and 3.

Analogously, similar paths for the liquids 90 and 100 can be assumed for the embodiments of FIG. 5.

Having described the invention by reference to specific embodiments, it should be apparent that variations are possible without departing from the scope of the invention defined in the appended claims. More specifically, although some aspects of the present invention have been identified as preferred, it is contemplated that the present invention is not necessarily limited to these preferred aspects. Particularly, what is claimed by the present invention is the concept making the realization of device 10 with the described or similar embodiments possible and not necessarily all the specific conditions to make it possible, as some of these, like for example the conditions necessary to drive a liquid by capillary force along a hydrophilic pattern, are known from the state of the art.

It is noted that terms like "preferably", "commonly", and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

What is claimed is:

1. A microfluidic device comprising:
   a substrate,
   a cover,
   at least one chamber formed between the substrate and the cover, said chamber comprising two opposite surfaces, one on the substrate and one on the cover respectively, wherein
   the surface of the substrate comprises at least one hydrophilic area and at least one adjoining hydrophobic area,
   the surface of the cover comprises at least one hydrophilic area and at least one adjoining hydrophobic area, and
   the at least one hydrophilic area on each said opposite surface of the chamber is confined within or surrounded by said adjoining hydrophobic area, and is in fluid communication with at least one lateral hydrophilic area configured for guiding liquids to the at least one chamber, and wherein said device is configured such that at least two liquids enter the at least one chamber, each wetting said hydrophilic area on one respective surface of the chamber without touching the opposite respective surface until the liquid confined to the hydrophilic area on each respective surface of the chamber coalesce and mix with each other as volume of the two liquids increases within the chamber.

2. The device according to claim 1, wherein said lateral hydrophilic area leading to said at least one chamber is comprised in a microchannel.

3. The device according to claim 2, wherein said microchannel further comprises lateral adjoining hydrophobic areas.

4. The device according to claim 2 or 3, wherein said microchannels are formed either in the substrate or in the cover, or both in the substrate and in the cover, or by at least one spacer layer positioned between the substrate and the cover.

5. The device according to claim 1, wherein said lateral hydrophilic areas are either on the substrate or on the cover, or both on the substrate and the cover.

6. The device according to claim 1, wherein the volume of the chamber is defined by the volume between the hydrophilic areas on the two opposite surfaces of the chamber.

7. The device according to claim 1, wherein the chamber is a micro-chamber.

8. The device according to claim 7, wherein the volume of the chamber is between about 0.01 µl and about 5 µl.

9. The device according to claim 7, wherein the volume of the chamber is between about 0.05 µl and about 2 µl.

10. The device according to claim 7, wherein the height of the chamber is less than about 1 mm.

11. The device according to claim 7, wherein the height of the chamber is less than about 300 µm.

12. The device according to claim 1, wherein the hydrophobic areas inside the chamber communicate with the outside of the device so that the inside of the device is vented from all sides.

13. The device according to claim 1, wherein the device comprises an array of chambers and an array of lateral hydrophilic areas, wherein at least two lateral hydrophilic areas lead to the same chamber.

14. The device according to claim 1, wherein the contact angle of the hydrophilic areas is below about 30 degrees.

15. The device according to claim 1, wherein the contact angle of the hydrophilic areas is below about 20 degrees.

16. The device according to claim 1, wherein the contact angle of the hydrophobic areas is above about 100 degrees.

17. The device according to claim 1, wherein the contact angle of the hydrophobic areas is above about 110 degrees.

18. The device according to claim 1, wherein the device is disposable and consists of a polymeric material.

19. The device according to claim 18, wherein the material is transparent.

20. The device according to claim 1, wherein liquids are guided into the chamber along and confined within the lateral hydrophilic areas by capillary force.

21. A method of mixing at least two liquids comprising:
   providing the device according to claim 1,
   guiding the at least two liquids into the chamber in a continuous way, that is each continuing to advance along its same plane, or that the at least two liquids enter the chamber in a discontinuous way, that is following the step due to the different depth of the chamber, and
   coalescing and mixing said at least two liquids within said chamber as volume of the at least two liquids increases within the chamber.

22. The method according to claim 21, wherein a detection is carried out in situ through a transparent body of each chamber.

23. The method according to claim 21 further comprising introducing an immiscible organic liquid into the chamber after the at least two liquids have been mixed, and transporting a mixed sample out of the chamber as a discrete droplet or plug.

24. The method according to claim 21, wherein the time in which the at least two liquids coalesce is identified as a pulsed, well defined start time for reaction kinetics studies.

25. A process for manufacturing the device according to claim 1, wherein hydrophilic and hydrophobic areas are generated using gas chemistry and plasma polymerization wherein a hydrophobic plasma polymerization step is executed first homogeneously on the surface to be hydrophilically patterned in order to yield a surface, which is more hydrophobic than the polymeric material used naturally might be, followed by masking and hydrophilic patterning on top of the hydrophobic surface.

26. The method according to claim 21 wherein said mixing said at least two liquids within said chamber forms a mixed sample, and further comprising:
   introducing an immiscible organic liquid into the chamber after the at least two liquids have been mixed,
   reacting the immiscible organic liquid with said mixed sample to form a reacted sample, and
   transporting the reacted sample out of the chamber as a discrete droplet or plug.

* * * * *